(12) United States Patent
Myoung et al.

(10) Patent No.: US 9,389,481 B2
(45) Date of Patent: Jul. 12, 2016

(54) ELECTROPHORETIC SLURRY COMPOSITION AND ELECTROPHORETIC DISPLAY DEVICE COMPRISING THE SAME

(75) Inventors: Hey-Jin Myoung, Seoul (KR); Ho-Suk Song, Yongin-si (KR); Hyeon-Jung Yoo, Yongin-si (KR); Young-Seo Yoon, Seoul (KR)

(73) Assignee: KOLON INDUSTRIES, INC., Kwacheon (KR)

( * ) Notice: Subject to any disclaimer, the term of this patent is extended or adjusted under 35 U.S.C. 154(b) by 229 days.

(21) Appl. No.: 14/116,906

(22) PCT Filed: Jun. 22, 2012

(86) PCT No.: PCT/KR2012/004954
§ 371 (c)(1),
(2), (4) Date: Nov. 11, 2013

(87) PCT Pub. No.: WO2013/002519
PCT Pub. Date: Jan. 3, 2013

(65) Prior Publication Data
US 2014/0063590 A1 Mar. 6, 2014

(30) Foreign Application Priority Data

Jun. 28, 2011 (KR) .................. 10-2011-0062970
May 29, 2012 (KR) .................. 10-2012-0056906

(51) Int. Cl.
*G02F 1/167* (2006.01)
*G02B 26/00* (2006.01)
(52) U.S. Cl.
CPC ........ *G02F 1/167* (2013.01); *G02F 2001/1678* (2013.01)

(58) Field of Classification Search
CPC ............. G02F 1/167; G02F 1/15; G02F 1/17; C08L 101/02
USPC ....... 524/431; 359/296; 252/519.21; 259/296
See application file for complete search history.

(56) References Cited

U.S. PATENT DOCUMENTS

2003/0151029 A1* 8/2003 Hsu .................... C09B 67/0004
252/500

FOREIGN PATENT DOCUMENTS

JP 2004-325632 A 11/2004
JP 2006-195379 A 7/2006
(Continued)

OTHER PUBLICATIONS

SpecialChem—Pliotec 7300—(http://coatings.specialchem.com/product/r-eliokem-omnova-solutions-pliotec-7300)—Downloaded Aug. 21, 2015.*
(Continued)

*Primary Examiner* — Ling Choi
*Assistant Examiner* — Ronald Grinsted
(74) *Attorney, Agent, or Firm* — Sughrue Mion, PLLC

(57) ABSTRACT

The present invention is directed to an electrophoretic slurry composition and an electrophoretic display device comprising the same, where the electrophoretic slurry comprises charged particles; polymer beads comprising an acryl- or vinyl-based repeating unit; and a fluid medium. Accordingly, the present invention has a high reactivity to a driving voltage, sustains images or text for a predetermined period of time or longer even when the driving voltage is switched off, and provides a high contrast ratio and enhanced visibility to implement high-quality text or images.

12 Claims, 3 Drawing Sheets

(56) References Cited

FOREIGN PATENT DOCUMENTS

| JP | 2006-292897 A | 10/2006 |
|---|---|---|
| JP | 2007-147838 A | 6/2007 |
| JP | 2008-145713 A | 6/2008 |
| KR | 10-2005-0087445 A | 8/2005 |
| KR | 10-2005-0087446 A | 8/2005 |
| KR | 10-2006-0078643 A | 7/2006 |
| KR | 10-2008-0093740 A | 10/2008 |
| KR | 10-2009-0031937 A | 3/2009 |
| KR | 10-2009-0056967 A | 6/2009 |

OTHER PUBLICATIONS

SpecialChem—Pliotec 7104—(http://coatings.specialchem.com/product/r-eliokem-omnova-solutions-pliotec-7104)—Downloaded Aug. 21, 2015.*
NOAA.gov—dodecylbenzene—(http://cameochemicals.noaa.gov/chris/DDB.pdf)—Online Jun. 17, 1999.*
Solvay Solexis (http://www.bt-electronics.com/wp-content/uploads/2012/01/Galden-Heat-Transfer2.pdf)—Online Aug. 19, 2004.*
International Search Report of PCT/KR2012/004954 dated Dec. 26, 2012.

* cited by examiner

ELECTROPHORETIC SLURRY COMPOSITION AND ELECTROPHORETIC DISPLAY DEVICE COMPRISING THE SAME

CROSS REFERENCE TO RELATED APPLICATIONS

This is a National Stage of International Application No. PCT/KR2012/004954 filed Jun. 22, 2012, claiming priority based on Korean Patent Application Nos.10-2011-0062970 filed Jun. 28, 2011 and 10-2012-0056906 filed May 29, 2012, the contents of all of which are incorporated herein by reference in their entirety.

TECHNICAL FIELD

The present invention relates to an electrophoretic slurry composition and an electrophoretic display device comprising the same and, more particularly, to an electrophoretic slurry composition and an electrophoretic display device comprising the same in which the electrophoretic slurry to composition has a high reactivity to a driving voltage, sustains images or text for a predetermined period of time or longer even when the driving voltage is switched off, and provides high contrast ratio and enhanced visibility to realize high-quality text or images.

BACKGROUND ART

Electronic paper or digital paper, also called e-paper, is an electronic device that is portable and can be opened at any time needed like a paper book, newspaper, or a paper magazine and written on like ordinary paper.

The electronic paper takes the form of an electrophoretic display, which is much advantageous over the conventional flat display in that it can be bent, far lower in production cost and superior in energy efficiency without requiring separate backlight. Such an electronic paper is very definite with a wide viewing angle and capable of providing a memory function that the text does not disappear completely even when the power is switched off.

With these advantages, the electronic paper can be used in a very wide range of applications, such as e-books or self-updating newspapers having a paper-like side and moving illustrations, reusable paper display for mobile phones, disposable TV screen, electronic wallpaper, and so forth, with vast potential for market growth. According to their implementation methods, the electronic papers can be categorized into electrophoretic display, liquid crystal display, toner display (QR-LPD: quick-response liquid powder display), and MEMS (micro-electro mechanical system) display. Among these displays, the electrophoretic display is based on the electrophoretic behavior of charged pigment particles suspended in a dielectric fluid and forms a color or contrast by rearranging charged pigment particles under attraction upon application of a voltage difference between the two opposing electrode panels.

Among the electrophoretic displays, the techniques most approaching commercialization are the microcapsule-based electrophoretic display and the microcup electrophoretic display, both of which use particles as color display elements. The microcapsule-based electrophoretic display is a display device in which a dispersion containing charged particles and a fluid medium is encapsulated into microcapsules and sandwiched between the two opposing electrode panels. The microcup electrophoretic display is a display device in which charged particles or charged particle slurry is enclosed in a concave unit defined by barriers between the two opposing electrode panels.

However, the existing electrophoretic displays can neither provide a wide color range or a high contrast ratio enough to be used in a variety of applications nor guarantee the reactivity to a driving voltage and an ability of adequately sustaining a residual image when the driving voltage is off.

DISCLOSURE

Technical Problem

The present invention is to provide an electrophoretic slurry composition that has a high reactivity to a driving voltage, sustains images or text for a predetermined period of time or longer even when the driving voltage is switched off, and provides high contrast ratio and enhanced visibility to realize high-quality text or images.

The present invention is also to provide an electrophoretic display comprising the electrophoretic slurry composition.

Technical Solution

The present invention provides an electrophoretic slurry composition comprising: charged particles; polymer beads comprising an acryl- or vinyl-based repeating unit; and a fluid medium.

The present invention also provides an electrophoretic display device comprising: two opposing substrates; an electrophoresis portion sandwiched between the two substrates; and the electrophoretic slurry composition provided in the electrophoresis portion.

Hereinafter, a detailed description will be given as to an electrophoretic slurry composition and an electrophoretic display device comprising the same according to the preferred embodiments of the present invention.

In accordance with one embodiment of the present invention, there is provided an electrophoretic slurry composition comprising: charged particles; polymer beads comprising an acryl- or vinyl-based repeating unit; and a fluid medium.

The studies made by the inventors of the present invention show that the electrophoretic slurry composition comprising specific polymer beads is highly reactive to a driving voltage and capable of preventing sedimentation of particles contained in the slurry or destabilization of the slurry even when the driving voltage is off, thereby sustaining text or images formed by the driving voltage for a predetermined period of time, that is, efficiently maintaining the stable phase of the text or images for a predetermined period of time or longer. Accordingly, the electrophoretic display device can provide high contrast ratio and enhanced visibility to realize high-quality text and images.

The term "electrophoretic slurry" as used herein refers to a dispersion including defined components (e.g., charged particles, polymer beads, etc.) in a fluid medium so that the components participate are susceptible to a defined reaction or driven by a specific driving voltage.

The term "bistability" as used herein refers to an ability of being switched between two electrically stable phases by a predetermined electrical trigger. For example, a predetermined voltage is applied to an electrophoretic display device to drive the electrophoresis portion to form a defined contrast or color characteristic. Here, there can be two stable phases: the one is when the voltage is applied, and the other is when the opposite voltage is applied.

The polymer beads may comprise an acryl- or vinyl-based repeating unit, that is, for example, at least one repeating unit selected from the group consisting of repeating units represented by the following formulas 1 and 2:

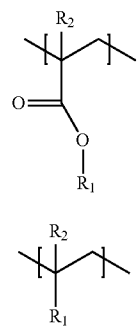

[Formula 1]

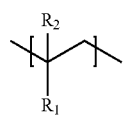

[Formula 2]

In the formula 1 or 2, $R_1$ is independently hydrogen, an alkyl group having 1 to 30 carbon atoms, an alkenyl group having 2 to 30 carbon atoms, an aryl group having 6 to 30 carbon atoms, an alkylaryl group having 7 to 30 carbon atoms, an arylalkyl group having 7 to 30 carbon atoms, a cycloalkyl group having 4 to 20 carbon atoms, an amide group substituted or unsubstituted with an alkyl group having 1 to 20 carbon atoms, and an alkoxycarbonyl group having 1 to 20 carbon atoms; and $R_2$ is independently hydrogen or an alkyl group having 1 to 3 carbon atoms.

In the repeating unit of the formula 1 or 2, when $R_1$ is a functional group having a predetermined volume or greater, such as, for example, an alkyl group having 2 to 30 carbon atoms, an alkenyl group having 2 to 30 carbon atoms, an aryl group having 6 to 30 carbon atoms, an alkylaryl group having 7 to 30 carbon atoms, an arylalkyl group having 7 to 30 carbon atoms, a cycloalkyl group having 4 to 20 carbon atoms, an amide group substituted or unsubstituted with an alkyl group having 1 to 20 carbon atoms, or an alkoxycarbonyl group having 1 to 20 carbon atoms, the polymer beads can have a defined space in the aspect of molecular structure due to the chain of the functional group introduced into the repeating unit, which leads to a low specific gravity relative to the conventional polymers. Further, the selection of an appropriate structure of the repeating unit allows the control of the specific gravity of the polymer beads.

In the formula 1 or 2, preferably, $R_1$ is independently an alkyl group having 3 to 20 carbon atoms, an aryl group having 6 to 10 carbon atoms, a cycloalkyl group having 5 to 10 carbon atoms, or an amide group substituted or unsubstituted with an alkyl group having 1 to 20 carbon atoms.

The polymer beads may have a true specific gravity of 2.00 g/cm³ or less, preferably 0.8 to 1.8 g/cm³, more preferably 1.0 to 1.6 g/cm³. The true specific gravity means the specific gravity of a substance itself other than the apparent specific gravity. More specifically, it is the specific gravity of a substance that reflects the pores between particles or inside the particles, and measured by injecting an inert gas into a closed chamber and calculating the change of pressure. The true specific gravity of a substance in the powder form can be obtained as the specific gravity of the substance measured with a pycnometer (Accupyc 1340, Micromeritics).

As having a specific value of the true specific gravity, the polymer beads can be disposed appropriately among charged particles and the fluid medium in the electrophoresis portion, so it is possible to prevent sedimentation of the particles in the electrophoretic slurry or destabilization of the slurry when the driving voltage is switched on or off.

When the true specific gravity of the polymer beads is extremely high or low, the polymer beads clusters in the top or bottom of the electrophoresis portion of the electrophoretic display device to cause a phase separation in the slurry, which may deteriorate not only the stability of the slurry but also the driving characteristic of the electrophoretic display device.

The polymer beads are preferably transparent for the prevention of deterioration in the contrast ratio of images or text implemented by the electrophoretic slurry composition. For example, the polymer beads may have a refraction index of 1.2 to 1.6, which leads to the contrast ratio of white enhanced by the scattering of light in the case of using the electrophoretic slurry composition. The controlled refraction index of the polymer beads comprising an acryl- or vinyl-based repeating unit can be acquired by choosing a proper type of the monomer or adjusting the refraction index of a liquid monomer as used in the synthesis of the polymer beads.

The polymer beads are not specifically limited in size and may have an average particle diameter of, preferably 10 nm to 30 μm, more preferably 50 nm to 10 μm. The average particle diameter of the polymer beads less than 10 nm increases the required amount of the polymer beads added to endow the electrophoretic display device with appropriate bistability, leading to an extremely high viscosity of the electrophoretic slurry composition and a deterioration of workability. The average particle diameter of the polymer beads greater than 30 μm deteriorate the fluidity of the polymer beads in the electrophoresis portion (less than 200 μm high) of an ordinary electrophoretic display device, consequently imposing a limitation in the height of the electrophoresis portion.

As described above, with including the specified polymer beads, the electrophoretic slurry composition can have an enhanced reaction rate upon application of a driving voltage and sustain the created text or images for a predetermined period of time even when the driving voltage is switched off. The content of the specified polymer beads is not specifically limited and may be, to with respect to 100 parts by weight of the composition, 0.1 to 20 parts by weight, preferably 1 to 10 parts by weight, more preferably 3 to 8 parts by weight, which content can enhance the driving characteristic of the electrophoretic slurry composition.

The polymer beads may be prepared from an acryl- or vinyl-based monomer by a known polymerization method. For example, an acryl- or vinyl-based monomer, a multifunctional monomer (i.e., a compound having a C—C double bond), and a polymerization initiator are mixed together in a dispersion medium and then subjected to polymerization reaction to prepare polymer beads.

The term "charged particles" as used herein refers to particles having a defined charged characteristic and migrating towards an oppositely charged electrode by attraction between the two electrodes to which a predetermined voltage is applied, thereby representing a color or contrast.

The "charged particles" as included in the electrophoretic slurry composition may be particles taking an electric charge by itself or electrically charged by a charge control agent. The charged particles are not specifically limited and may be any charged particles generally known to be used for electrophoretic displays.

The charged particles are not specifically limited in size and may preferably have an average particle diameter of several hundreds of nanometers to several hundreds of submicrons, more preferably 100 nm to 100 μm.

The charged particles may have an appropriate range of average electric potential, depending on the characteristics of the electrophoretic slurry composition or the electrophoretic display device, preferably in the range of −200 mV to +200 mV.

The charged particles are required to be chemically stable and not to be swollen or softened by the fluid medium. And, the electrophoretic slurry needs to be stable without sedimentation, coagulation, or flocculation under known working conditions of an electrophoretic display device.

The charged particles may be properly selected depending on the color or contrast characteristic to be implemented in the electrophoretic display device. For example, white charged particles are metallic inorganic particles, including $TiO_2$, MgO, ZnO, or $ZrO_2$, or an organic compound of these; and colored charged particles are organic or inorganic pigments, such as iron oxide, CrCu, carbon black, etc.

The charged particles may comprise a core including an acrylate- or vinyl-based repeating unit, and polymer particles including white or colored inorganic particles bound to the surface of the core. The acrylate- or vinyl-based repeating unit is as defined in the formulas 1 and 2.

The white inorganic particles bound to the surface of the core may include titanium oxide, magnesium oxide, zinc oxide, calcium oxide, zirconium oxide, or mixtures of these. The colored inorganic particles bound to the surface of the core may include metallic compounds, such as iron oxide, CrCu, or carbon black, or colored pigment compounds, such as phthalocyanine blue, phthalocyanine green, diarylide yellow, diarylide AAOT yellow, quinacridone pigment series, azo pigment series, rhodamine pigment series, perylene pigment series, or Hansa yellow G particles.

The charged particles may be contained in an amount of, with respect to 100 parts by weight of the composition, 30 to 80 parts by weight, preferably 50 to 70 parts by weight. The extremely lower content of the charged particles causes difficulty of producing text or images or deteriorates the driving characteristic or the contract ratio due to the decrease in the reflection effect by the particles. The extremely greater content of the charged particles leads to an excessive increase in the viscosity of the electrophoretic slurry or deteriorates the fluidity of the charged particles.

The charged particles may be colored with a color pigment, the specific examples of which include phthalocyanine blue, phthalocyanine green, diarylide yellow, diarylide AAOT yellow, quinacridone pigment series, azo pigment series, rhodamine pigment series, perylene pigment series, or Hansa yellow G particles. The color pigments used to color the charged particles are not specifically limited to those examples and may include any color pigments insoluble to the fluid medium and known to be used for coloring charged particles.

The fluid medium may be, if not specifically limited to, a solvent having a viscosity of 20 cP or less, more preferably a hydrocarbon-based solvent having a viscosity of 20 cP or less.

The fluid medium may also be a solvent having a dielectric constant of 2 to 30. The examples of such a fluid medium include, but not specifically limited to, hydrocarbons, such as decahydronaphthalene (DECALIN), 5-ethylidene-2-norbornene, fatty oil, or paraffin oil (e.g., Isopar G, Isopar L, Isopar M, etc.); aromatic hydrocarbons, such as toluene, xylene, phenyl xylyl ethane, dodecylbenzene, or alkylnaphthalene; halogenated solvents, such as perfluorodecalin, perfluorotoluene, perfluoroxylene, dichlorobenzotrifluoride, 3,4,5-trichlorobenzoyltrifluoride, chloropentafluoro-benzene, dichlorononane, or pentachlorobenzene; perfluoro solvents; or lower halogen solvents containing polymers such as perfluoropolyalkylether.

The fluid medium may be transparent, translucent, or colored according to the characteristic of the electrophoretic display device. The translucent or colored fluid medium may be colored with a dye. The examples of the dye used to color the fluid medium may include, but not specifically limited to, nonionic azo dye, anthraquinone dye, fluorinated dye, phthalocyanine blue, phthalocyanine green, diarylide yellow, diarylide AAOT yellow, quinacridone pigment series, azo pigment series, rhodamine pigment series, perylene pigment series, Hansa yellow G particles, carbon black, and so forth.

The content of the fluid medium may be appropriately controlled in consideration of the amounts of the polymer beads and the charged particles, and the content range may be properly varied depending on the use of additives.

The preparation method for the electrophoretic slurry composition is not specifically limited and may be any known method used to prepare a slurry composition of charged particles. For example, the electrophoretic particles, the fluid medium, and the polymer beads are mixed together by a known method, such as grinding, milling, attriting, microfludizing, or ultrasonication, to form an electrophoretic slurry uniformly dispersed.

In accordance with another embodiment of the present invention, there is provided an electrophoretic display device comprising: two opposing substrates; an electrophoresis portion sandwiched between the two substrates; and the electrophoretic slurry composition provided in the electrophoresis portion.

Due to high stability and reactivity of the electrophoretic slurry comprising the specified polymer beads, the electrophoretic display device can not only acquire high reactivity and bistability or an ability of implementing a bistable phase upon application of a driving voltage but also prevent sedimentation of particles in the slurry or destabilization of the slurry when the driving voltage is switched off, so the text or images formed by the driving voltage can be more efficiently sustained for a predetermined period of time. Thus the electrophoretic display device has a high contrast ratio and enhanced visibility to implement high-quality text and images and secures high stability of the electrophoresis portion to minimize the deterioration of performance after a long-term use.

As illustrated in FIG. 1, the electrophoretic display device allows the specified polymer beads to be dispersed uniformly in the electrophoresis portion upon the driving voltage switched on or off, thereby implementing bistability more efficiently, and sustains images, text, or a residual image formed by the charged particles for a predetermined period of time or longer. FIG. 1 shows white or black charged particles disposed on the side of the substrate, and polymer beads sandwiched between the charged particles. As given only to illustrate an example of the electrophoretic display device, FIG. 1 is not intended to limit the specific example of the electrophoretic display device and may be modified in design in different variations, without any specific limitation in the color or contrast of the charged particles.

The electrophoretic slurry composition disposed in the electrophoresis portion is as specified above. In particular, the polymer beads may comprise an acryl- or vinyl-based repeating unit and have a true specific gravity of 2.00 $g/cm^3$ or less, preferably 0.8 to 1.8 $g/cm^3$, more preferably 1.0 to 1.6 $g/cm^3$, a refraction index of 1.2 to 1.6, and an average particle diameter of 10 nm to 30 µm, more preferably 50 nm to 10 µm.

The term "substrate" as used herein refers to a base plane constituting both sides, such as top and bottom sides in the electrophoretic display device. As for the substrate, different types of layers or constructions, or electrodes for electrophoresis can be formed on the one side of the substrate or included in the substrate.

Thus the substrate may comprise a base layer, a conductive base layer, an electrode layer, or the like. The base layer is not specifically limited and includes any base layer known to be usable as a base material or a substrate for display device. The specific examples of the base layer include a thermoplastic or thermosetting resin, or PET, PAN, PI, glass, and so forth. The conductive base layer is not specifically limited and includes any conductive material known to be used for display devices, such as CNT, conductive polymer, or the like. The electrode layer is not specifically limited and includes any known electrode material used for display devices. Preferably, at least one of the electrode materials included in both substrates is a transparent electrode material, such as ITO, $SnO_2$, ZnO, or IZO (indium zinc oxide).

The term "electrophoresis portion" as used herein refers to the portion in which upon a voltage difference applied between the two opposing substrates, the charged particles migrate towards the oppositely charged electrode by attraction to implement a color or contrast. The electrophoresis portion may comprise the above-specified electrophoretic slurry composition.

The electrophoresis portion is not specifically limited in its shape or structure. For example, the electrophoresis portion may include a microcapsule or microcup structure. The term "microcup" as used herein refers to the cup-shaped concave portion formed in the electrophoretic display device, such as, for example, a space surrounded by the two opposing electrodes and barriers formed between the electrodes. The term "microcapsule" as used herein refers to a closed container of a spheroidal or elliptical shape with micrometer-scaled diameter as formed in the electrophoretic display device.

The size and shape of the microcup is defined by the barriers formed in the electrophoresis portion and may be appropriately controlled depending on the characteristic and size of the electrophoretic display device to be fabricated. For example, the barriers of the microcup may be, but not specifically limited to, 10 to 100 μm high and 5 to 50 μm thick, with a cross-section of any shape, such as rectangle, square, trapezoid, or the like. The microcup may take a plane shape, such as circle, triangle, quadrangle, oval, or other polygons.

The size and material of the 'microcapsule' may be controlled depending on the characteristic of the display to be fabricated. For example, the individual microcapsule may take a spheroidal or elliptical shape with the maximum particle diameter of 10 to 200 μm. If not specifically limited, the 'microcapsule' may be bound to a defined substrate together with a binder or an organic solvent to constitute an electrophoresis portion. Any electrophoresis portion known to be usable for microcapsule-based electrophoretic displays can be used without any specific limitations.

The electrophoretic slurry composition is disposed in the electrophoresis portion. In other words, the charged particles and the polymer beads suspended in a defined fluid medium can be included in the electrophoresis portion. The charged particles, the fluid medium, and the polymer beads are as defined above. The volume ratio of the fluid medium in the electrophoretic slurry may be 40 to 95%.

Advantageous Effects

The present invention can provide an electrophoretic slurry composition and an electrophoretic display device comprising the electrophoretic slurry composition, which is highly reactive to a driving voltage to sustain images or text for a predetermined period of time or longer when the driving voltage is switched off, and capable of providing a high contrast ratio and enhanced visibility to implement high-quality text or images.

MODE FOR INVENTION

Figure 1:
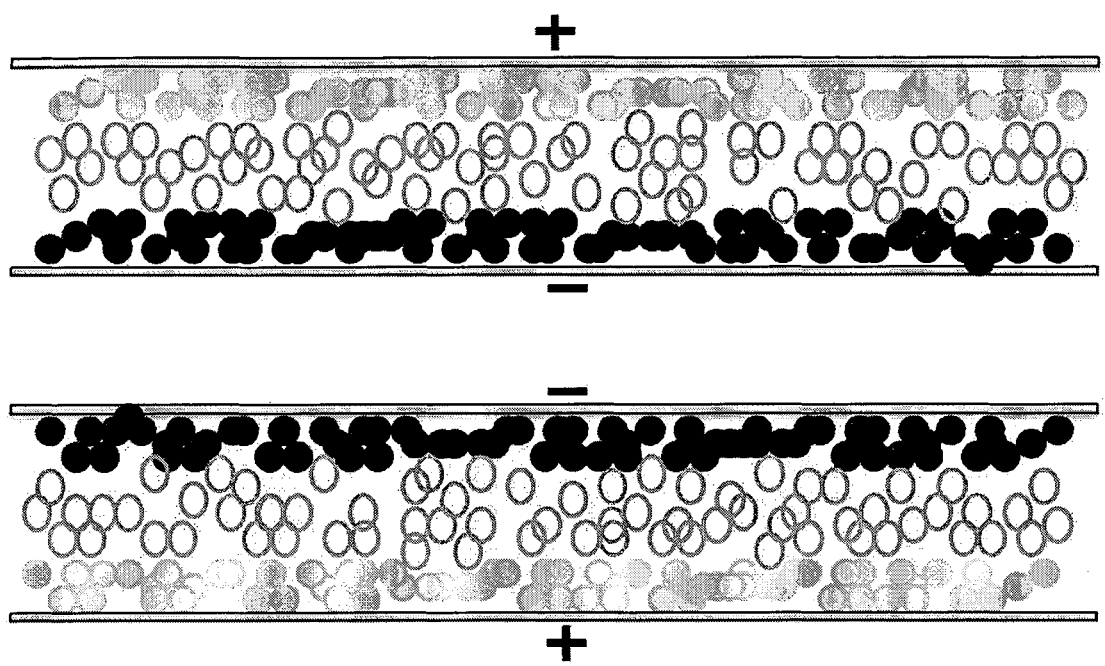
FIG. 1 is a schematic diagram showing an electrophoretic display device according to the present invention.

Hereinafter, the present invention will be described in detail with reference to the following examples, which are given only to exemplify the present invention and not intended to limit the scope of the present invention.

PREPARATION EXAMPLE A

Preparation of Polymer Beads

PREPARATION EXAMPLE 1

80 g of lauryl methacrylate (LMA) and 20 g of ethylene glycol dimethacrylate (EGDMA) as a multi-functional monomer were mixed together, and 1 g of 2,2'-azobis(2,4-dimethylvaleronitrile) (ADVN) as a polymerization initiator was added to the mixture. The resultant mixture was added to a solution prepared by dissolving 5 g of polyvinyl alcohol (PAV) as a dispersion stabilizer in ionized water used as a dispersion solvent. The solution thus obtained was homogenized into an emulsion with a homogenizer at 8,000 rpm for 5 minutes.

Subsequently, the emulsion was put in a reaction tube, kept at 50° C. for 6 hours of reaction in the nitrogen atmosphere and then warmed up to 75° C. for 4 more hours of reaction. The polymer thus obtained was filtered out, washed with an aqueous solution of ethanol and water and then dried out in a vacuum oven overnight to prepare white odorless spherical polymer composite beads.

PREPARATION EXAMPLE 2

The procedures were carried out to prepare white odorless spherical polymer composite beads in the same manner as described in Example 1, excepting that 60 g of lauryl methacrylate and 20 g of methyl methacrylate were used and mixed with 20 g of ethylene glycol methacrylate (EGDMA) as a multi-functional monomer to prepare an emulsion.

PREPARATION EXAMPLE 3

The procedures were carried out to prepare white odorless spherical polymer composite beads in the same manner as described in Example 1, excepting that 40 g of lauryl methacrylate and 40 g of methyl methacrylate were used and mixed with 20 g of ethylene glycol methacrylate (EGDMA) as a multi-functional monomer to prepare an emulsion.

PREPARATION EXAMPLE 4

The procedures were carried out to prepare white odorless spherical polymer composite beads in the same manner as described in Example 1, excepting that 20 g of lauryl methacrylate and 60 g of methyl methacrylate were used and mixed with 20 g of ethylene glycol methacrylate (EGDMA) as a multi-functional monomer to prepare an emulsion.

PREPARATION EXAMPLE 5

The procedures were carried out to prepare white odorless spherical polymer composite beads in the same manner as described in Example 1, excepting that 80 g of methyl methacrylate was used and mixed with 20 g of ethylene glycol methacrylate (EGDMA) as a multi-functional monomer to prepare an emulsion.

PREPARATION EXAMPLE B

Preparation of Charged Particles

PREPARATION EXAMPLE 6

5 g of polyvinyl alcohol (PVA) as a dispersion stabilizer and 20 g of white charged particles ($TiO_2$, Dupont, 200~400 nm) or black particles (copper chromate, Shephed) were mixed with an ethanol dispersion medium, and the mixture solution was homogenized with a homomixer at 6,000 rpm for 30 minutes to prepare a first dispersion solution.

Then, 60 g of methyl methacrylate, 10 g of lauryl methacrylate, 10 g of methacrylic acid, 20 g of ethylene glycol dimethacrylate as a multi-functional acrylate-based monomer, and 1 g of 2,2'-azobis(2,4-dimethylvaleronitrile) as a polymerization initiator were mixed together to prepare a second dispersion solution.

The first dispersion solution was added to the second dispersion solution to prepare a mixture solution, which was then homogenized into an emulsion with a high-speed homogenizer at 4,000 rpm for 10 minutes. The emulsion was put in a reaction tube, kept at 50° C. for 6 hours of reaction in the nitrogen atmosphere and then warmed up to 75° C. for 4 more hours of reaction. The polymer thus obtained was filtered out, washed with an aqueous solution of ethanol and water and then dried out in a vacuum oven overnight to prepare charged particles.

EXAMPLES AND COMPARATIVE EXAMPLES

Preparation of Electrophoretic Slurry and Electrophoretic Display Device

Example 1

(1) Preparation of Electrophoretic Slurry
The white charged particles and the black charged particles prepared in Preparation Example 6 at a ratio of 5:1 were dispersed in a hydrocarbon-based solvent (Isopar G:Halocarbon=1:1 solution). To the dispersion was added 3 wt % of the polymer beads of Preparation Example 3 with respect to the total weight of the composition to prepare an electrophoretic slurry composition, which contains 60 wt % of the charged particles.

(2) Preparation of Electrophoretic Display Device
Immediately or 7 days after the preparation, the electrophoretic slurry was injected into ITO cells (40 mm×45 mm×80 μm) in which electric current can flow, on the top and bottom substrates to prepare an electrophoretic display device.

The electrophoresis portion of the electrophoretic display device was of a microcup structure, where the size of the cell defined by each microcup was 250 μm×250 μm×50 μm.

Example 2

The procedures were carried out to prepare an electrophoretic slurry composition and an electrophoretic display device in the same manner as described in Example 1, excepting that the polymer beads of Preparation Example 5 were used.

Comparative Example (1) Preparation of Electrophoretic Slurry
The white charged particles and the black charged particles prepared in Preparation Example at a ratio of 5:1 were dispersed in a hydrocarbon-based solvent (Isopar G:Halocarbon=1:1 solution) to prepare an electrophoretic slurry composition (containing 50 wt % of the charged particles).

(2) Preparation of Electrophoretic Display Device
The procedures were carried out to prepare an electrophoretic display device in the same manner as described in Example 1, excepting that the electrophoretic slurry prepared above was used.

EXPERIMENTAL EXAMPLES

Experimental Example 1

Measurement of Properties of Polymer Beads
(Density, Average Particle Diameter, etc.)

The spheroidal polymer beads prepared in Preparation Examples 1 to 5 were subjected to SEM observation and measurements of production yield, average particle size, and true specific gravity). The measurement results are presented in Table 1. The specific measurement equipment and methods are defined below.

(1) SEM observation: SEM was conducted using Hitachi S-4300 equipment with 10,000× magnification to examine the polymer beads. Sorting out distorted or uneven-surfaced polymer beads, the evaluation result declared "good" when the number of spheroidal polymer beads with normal physical form was 95% or above of the total number of the polymer beads examined; or "bad" when the number of spheroidal polymer beads with normal physical form was less than 95%.

(2) Measurement of production yield: The production yield was calculated from the weights of the reactants (e.g., a monomer, a multi-functional monomer, an initiator, other inorganic substances, etc.) used in the preparation and the amount of the polymer beads produced.

(3) Average particle size: ELSZ (Otsuka Electronics Co. Ltd.)

(4) C.V. %: (standard deviation of particle diameter/average particle diameter of particles)×100

(5) Measurement of true specific gravity: Pycnometer (Micromeritics instrument)

(6) Measurement of solvent resistance:

The white charged particles and the black charged particles prepared in Preparation Example 6 at a ratio of 5:1 were dispersed in a hydrocarbon-based solvent (Isopar G:Halocarbon=1:1 solution). The polymer beads prepared in each of Preparation Examples 1 to 5 were then added in a content of 3 wt % with respect to the total weight of the composition to prepare an electrophoretic slurry composition, which contained 60 wt % of the charged particles.

8 hours after the preparation, the electrophoretic slurry composition was measured in regard to viscosity and evaluated as "⊚" for the viscosity of 100 cp or less, "○" for the viscosity greater than 100 cp and 200 cp or less, and "Δ" for the viscosity greater than 200 cp. The viscosity measurement was conducted with the Brookfield DV II viscometer.

TABLE 1

Results of Experimental Example 1

| | Preparation Example | | | | |
|---|---|---|---|---|---|
| | 1 | 2 | 3 | 4 | 5 |
| SEM | Good | Good | Good | Good | Good |
| Average Particle Size ($\mu m$) | 4.3 | 4.5 | 4.8 | 4.6 | 4.2 |
| True Specific Gravity ($g/cm^3$) | 1.15 | 1.18 | 1.20 | 1.23 | 1.25 |
| Solvent Resistance | ○ | ○ | ⊚ | ⊚ | ⊚ |
| C.V. | 15.5 | 18.2 | 15.9 | 19.8 | 34.3 |
| Yield (%) | 94.5 | 95.0 | 95.0 | 95.6 | 95.0 |

As can be seen from Table 1, the polymer beads prepared in Preparation Examples 1 to 5 were 95% or more in the proportion of spheroidal particles with normal physical form and a production yield of 90% or above.

The polymer beads from Preparation Examples 1 to 5 had an average particle size of 4.2 to 4.8 $\mu m$ and a true specific gravity of 1.15 to 1.25 $g/cm^3$. In particular, the polymer beads of Preparation Examples 1 to 4 using a monomer to with a lauryl group relatively had a low true specific gravity and a uniform particle diameter distribution.

Being insoluble to the solvent used in the electrophoretic slurry, the polymer beads obtained from the Preparation Examples had a viscosity of 200 cp or less. Particularly, the solvent resistance was much more enhanced when the polymer beads were prepared using 50 wt % or less of a large-sized monomer in unit molecule, such as, for example, lauryl methacrylate.

Experimental Example 2

Stabilization of Electrophoretic Slurry

Each of the electrophoretic slurries prepared in Examples 1 and 2 and Comparative Example was stored in a clear glass bottle for 7 days. The results of observation are presented in FIG. 2.

Figure 2:
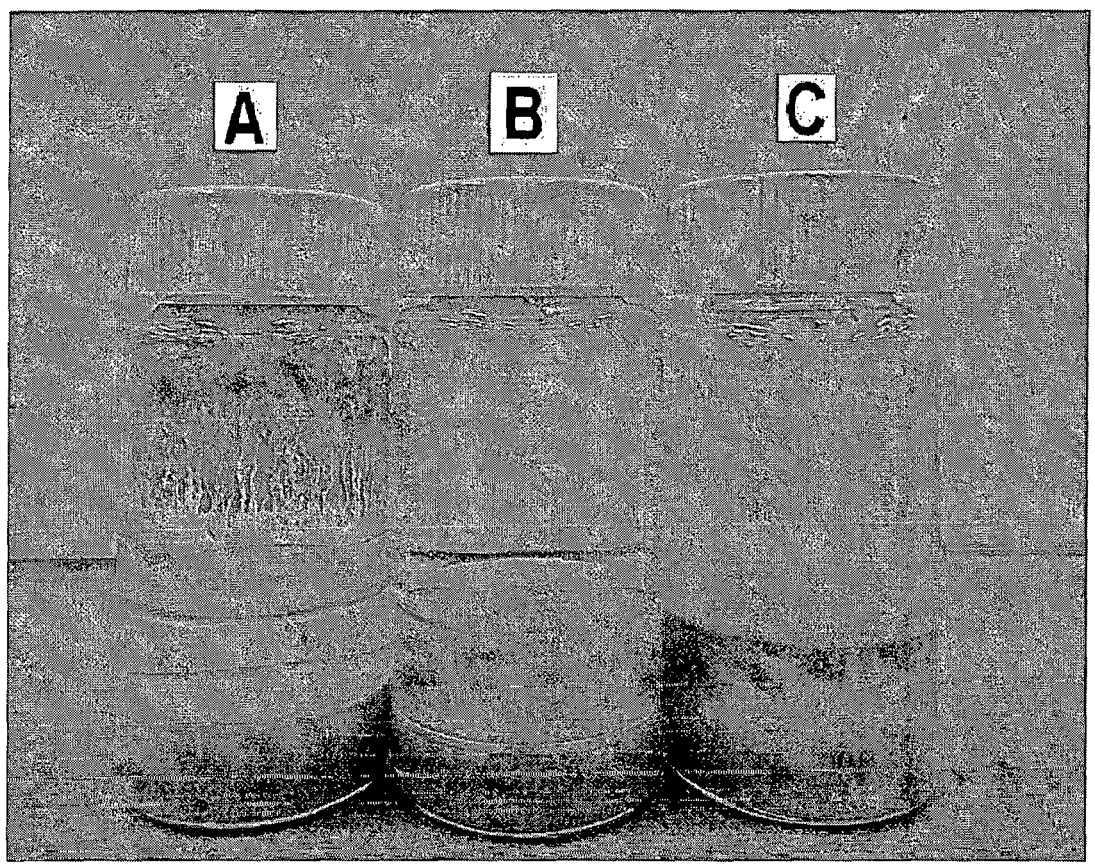
FIG. 2 shows the evaluation results on the dispersion stability of electrophoretic slurries according to Examples and Comparative Example.

As can be seen from FIG. 2, in seven days after the preparation, the electrophoretic slurry without addition of the polymer beads (as prepared in Comparative Example) had a definite phase separation between particles and the fluid medium with an elapse of time. In contrast, the electrophoretic slurries with the polymer beads of Preparation Examples 3 and 5 had good dispersibility. Particularly, the slurry with the polymer beads of Preparation Example 3 had a density nearly equivalent to that of the block/white charged particles of Preparation Example 6, so the individual ingredients were uniformly dispersed in a stable way.

Accordingly, the electrophoretic display device using the electrophoretic slurries of the examples allows stable dispersion of the charged particles and the polymer beads in the fluid medium, avoiding sedimentation of the particles, even when the driving voltage is switched off, and thus maintains one stable phase, that is, sustaining text or images formed by the driving voltage for a predetermined period of time or longer.

Experimental Example 3

Driving Characteristic of Electrophoretic Display Device

Figure 3:
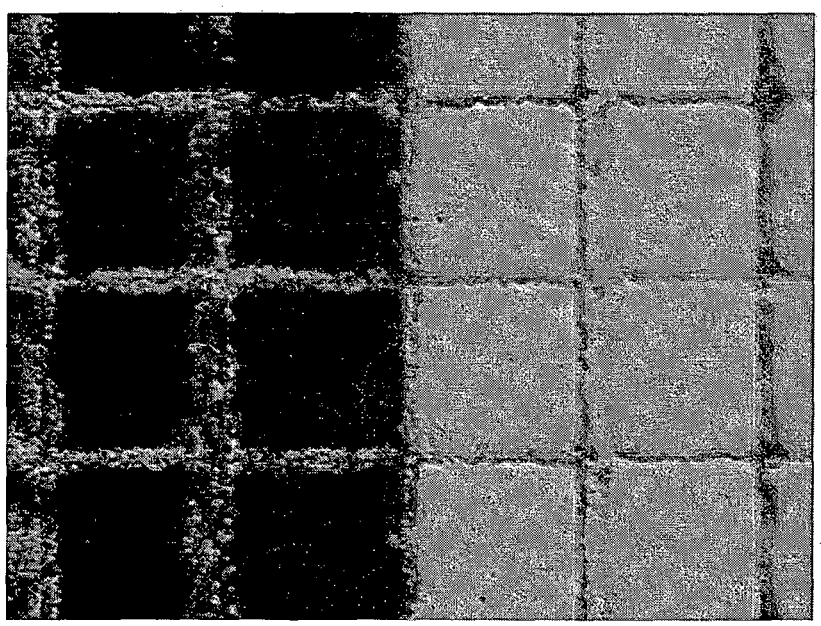
FIG. 3 shows the observed driving characteristic of an electrophoretic display to which the electrophoretic slurry of Example 1 is applied immediately after the preparation.
Figure 5:
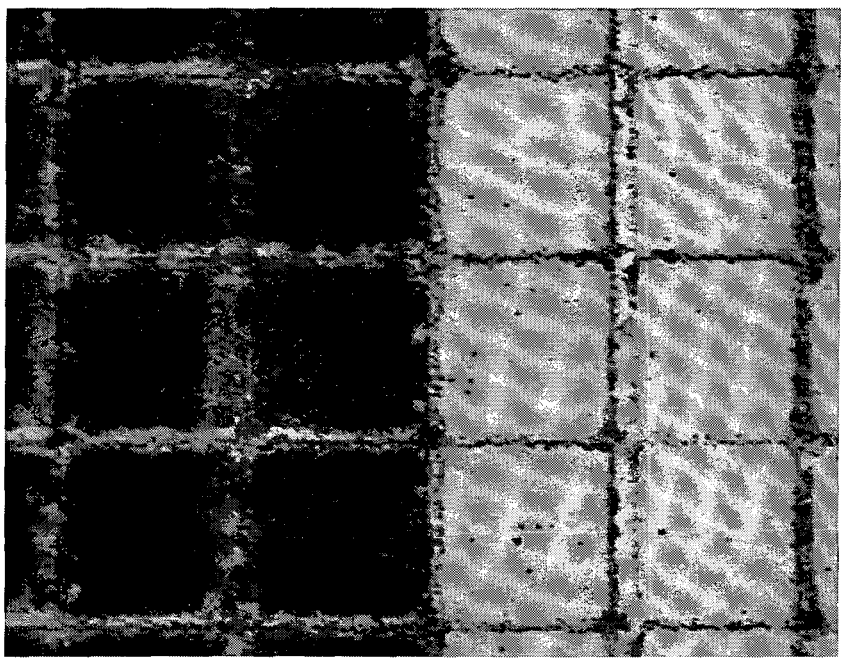
FIG. 5 shows the observed driving characteristic of an electrophoretic display to which the electrophoretic slurry of Example 1 is applied after 7 days of storage.

FIGS. 3 and 5 show the driving characteristic (with a driving voltage of 15 V) of an electrophoretic display device using the electrophoretic slurry of Example 1 immediately after the preparation and an electrophoretic display device using the electrophoretic slurry of Example 1 seven days after the preparation.

As the slurry of Example 1 acquired stability by using an appropriate amount of polymer beads, the electrophoretic display device had a high contrast ratio in both cases when the slurry was used in the electrophoretic display device immediately after its preparation or 7 days after its preparation.

Figure 4:
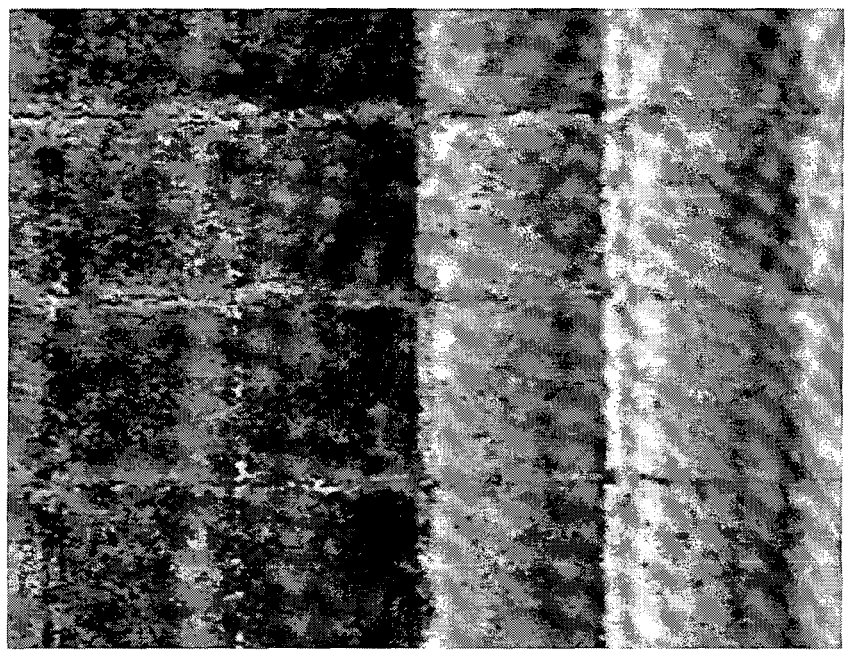
FIG. 4 shows the observed driving characteristic of an electrophoretic display to which the electrophoretic slurry prepared of Comparative Example is applied immediately after the preparation.

In contrast, as shown in FIG. 4, when the electrophoretic slurry of Comparative Example was applied to the electrophoretic display device 7 days after its preparation, the dispersibility of the slurry was deteriorated with occurrence of a phase separation of the individual particles, and the electrophoretic display device had an extreme deterioration of the contrast ratio.

Experimental Example 4

Performance Testing of Electrophoretic Display Device—Measurement of Contrast Ratio The electrophoretic display devices obtained in the examples and the comparative example were measured in regard to the contrast ratio. More specifically, after application of voltages +15 V and −15 V, the absolute value of the maximum white reflection ratio and that of the minimum black reflection ratio were measured and reduced in terms of ratio by division to determine the contrast ratio.

(1) More specifically, the contrast implemented by the ITO cells was measured with a luminescence meter (Chroma Meter CS-100A, Konica Minolta) to determine the luminescence, and the amount of light irradiated on a standard white plate (barium sulfate) was set to 100 $cd/m^2$ to calculate L*value (luminescence). The results are presented in Table 2.

TABLE 2

Contrast Ratio

| | Black Contrast Ratio | White Contrast Ratio |
|---|---|---|
| Comparative Example | 13.4:1 | 10.2:1 |
| Example 1 | 18.7:1 | 16.1:1 |
| Example 2 | 18.4:1 | 15.8:1 |

As can be seen from Table 2, the electrophoretic display devices of Examples 1 and 2 had a black contrast ratio of 18:1 or above and a white contrast ratio of 15:1 or above, acquiring high contrast ratio and enhanced visibility to implement high-quality text or images.

Contrarily, the electrophoretic display device of Comparative Example had a low black contrast ratio and a low white contrast ratio, potentially with a limitation in implementing high-quality text or images.

(2) The electrophoretic display device was measured in regard to a luminescence A, which was measured immediately after preparation of the electrophoretic display device, and a luminescence B, which was measured 7 days after removal of the voltage from the electrophoretic display device. Then, the rate of change in the contrast ratio, "(A−B)/A", was calculated. The measurement results are presented in Table 3.

TABLE 3

| | Rate of Change in Contrast Ratio | |
|---|---|---|
| | Rate of Change in Black Contrast Ratio | Rate of Change in White Contrast Ratio |
| Comparative Example | 4.83 | 0.61 |
| Example 1 | 0.625 | 0.135 |
| Example 2 | 1.385 | 0.251 |

As can be seen from Table 3, the electrophoretic display devices of Examples 1 and 2 were not so high in the rate of change in the black contrast ratio and the white contrast ratio. In contrast, the electrophoretic display device of Comparative Example had a deterioration of the stability 7 days after removal of the voltage and thus an abrupt rise of the black luminescence. Further, the rate of change in the white contrast for this device was greater than twice the rate of change in the white contrast for the devices of Examples 1 and 2.

In other words, the electrophoretic display devices of the examples had a high contrast ratio and enhanced visibility, thus implementing high-quality text and images, and minimized the performance deterioration after a long-term use due to the high stability of the electrophoresis portion.

The invention claimed is:

1. An electrophoretic slurry composition comprising:
a fluid medium;
charged particles dispersed in the fluid medium; and
polymer beads dispersed in the fluid medium,
wherein the polymer beads are contained in an amount of 1 to 10 parts by weight with respect to 100 parts by weight of the composition,
wherein the charged particles are contained in an amount of 30 to 80 parts by weight with respect to 100 parts by weight of the composition, and
wherein the polymer beads comprise at least one repeating unit selected from the group consisting of repeating units represented by the following formulas 1 and 2:

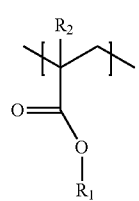

[Formula 1]

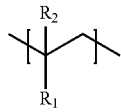

[Formula 2]

wherein $R_1$ is independently hydrogen, an alkyl group having 1 to 30 carbon atoms, an alkenyl group having 2 to 30 carbon atoms, an aryl group having 6 to 30 carbon atoms, an alkylaryl group having 7 to 30 carbon atoms, an arylalkyl group having 7 to 30 carbon atoms, a cycloalkyl group having 4 to 20 carbon atoms, an amide group substituted or unsubstituted with an alkyl group having 1 to 20 carbon atoms, and an alkoxycarbonyl group having 1 to 20 carbon atoms; and
$R_2$ is independently hydrogen or an alkyl group having 1 to 3 carbon atoms.

2. The composition as claimed in claim 1, wherein the polymer beads have a true specific gravity of 0.8 to 1.8 g/cm³.

3. The composition as claimed in claim 1, wherein the polymer beads have a refraction index of 1.2 to 1.6.

4. The composition as claimed in claim 1, wherein the polymer beads have an average particle diameter of 50 nm to 10μm.

5. The composition as claimed in claim 1, wherein the charged particles comprise at least one selected from the group consisting of:
white particles comprising metallic inorganic particles including $TiO_2$, MgO, ZnO, or $ZrO_2$, or an organic compound thereof;
colored particles comprising iron oxide, CrCu, and carbon black; and
polymer particles having the surface thereof bound to the white or colored particles and comprising an acrylate- or vinyl-based repeating unit.

6. The composition as claimed in claim 1, wherein the charged particles have an average particle diameter of 100 nm to 100μm.

7. The composition as claimed in claim 1, wherein the charged particles have an average electric potential of −200 mV to +200 mV.

8. The composition as claimed in claim 1, wherein the fluid medium has a viscosity of 20 cP or below.

9. The composition as claimed in claim 1, wherein the fluid medium comprises a solvent having a dielectric constant of 2 to 30.

10. The composition as claimed in claim 1, wherein the fluid medium comprises at least one solvent selected from the group consisting of decahydronaphthalene (DECALIN), 5-ethylidene-2-norbornene, fatty oil, paraffin oil (e.g., Isopar G, Isopar L, Isopar M, etc.), toluene, xylene, phenyl xylyl ethane, dodecylbenzene, alkylnaphthalene, perfluorodecalin, perfluorotoluene, perfluoroxylene, dichlorobenzotrifluoride, 3,4,5-trichlorobenzoyltrifluoride, chloropentafluoro-benzene, dichlorononane, pentachlorobenzene, perfluoro solvent, and a lower halogen solvent containing polymers such as perfluoropolyalkylether.

11. An electrophoretic display device comprising:
two opposing substrates;
an electrophoresis portion sandwiched between the two substrates; and
the electrophoretic slurry composition of claim 1 provided in the electrophoresis portion.

12. The electrophoretic display device as claimed in claim 11, wherein the electrophoresis portion comprises microcells or microcups.

* * * * *